(12) United States Patent
Korus

(10) Patent No.: US 9,885,430 B1
(45) Date of Patent: *Feb. 6, 2018

(54) SUSPENDED PIPE ASSEMBLY

(71) Applicant: LINDSAY CORPORATION, Omaha, NE (US)

(72) Inventor: Thomas J. Korus, Lindsay, NE (US)

(73) Assignee: Lindsay Corporation, Omaha, NE (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/626,528

(22) Filed: Jun. 19, 2017

Related U.S. Application Data

(63) Continuation of application No. 15/287,112, filed on Oct. 6, 2016, now Pat. No. 9,683,680.

(51) Int. Cl.
| | |
|---|---|
| *B05B 3/18* | (2006.01) |
| *F16L 3/18* | (2006.01) |
| *A01G 25/09* | (2006.01) |
| *F16L 27/12* | (2006.01) |
| *F16L 51/02* | (2006.01) |
| *F16L 3/12* | (2006.01) |

(52) U.S. Cl.
CPC ............. *F16L 3/18* (2013.01); *A01G 25/092* (2013.01); *F16L 3/12* (2013.01); *F16L 27/12* (2013.01); *F16L 51/02* (2013.01)

(58) Field of Classification Search
CPC ......... A01G 25/092; A01G 25/09; F16L 3/12; F16L 27/12; F16L 51/02
USPC .......... 248/58; 239/722, 723, 726, 727, 728, 239/730, 739, 743, 744
See application file for complete search history.

(56) References Cited

U.S. PATENT DOCUMENTS

| | | | | |
|---|---|---|---|---|
| 6,131,833 A | * | 10/2000 | Chapman | A01G 25/092 239/728 |
| 7,229,032 B1 | * | 6/2007 | Christensen | A01G 25/092 239/728 |
| 7,938,343 B2 | * | 5/2011 | Vorderstrasse | A01G 25/092 239/722 |
| 9,545,063 B1 | * | 1/2017 | Kastl | A01G 25/092 |
| 9,683,680 B1 | * | 6/2017 | Korus | A01G 25/092 |
| 2003/0029943 A1 | * | 2/2003 | Malsam | A01G 25/092 239/722 |
| 2012/0305682 A1 | * | 12/2012 | Korus | A01G 25/092 239/731 |
| 2013/0284861 A1 | * | 10/2013 | Korus | B60B 25/02 248/49 |

* cited by examiner

Primary Examiner — Todd M Epps
(74) Attorney, Agent, or Firm — Hovey Williams LLP

(57) ABSTRACT

A suspended pipe assembly comprising a first suspended pipe, a second suspended pipe, a third suspended pipe, and a number of suspenders for suspending the pipes from an elevated pipe or pipes of a mobile irrigation system or other fluid distribution system. The first suspended pipe and second suspended pipe are connected together via a fixed joint. The second suspended pipe and third suspended pipe are connected together via a live joint such that the second suspended pipe and third suspended pipe can expand longitudinally relative to each other. Additional suspended pipes can be connected to each other via alternating fixed and live joints. The suspenders allow the suspended pipes to expand longitudinally relative to the elevated pipe and prevents the suspended pipes from warping side-to-side.

20 Claims, 3 Drawing Sheets

SUSPENDED PIPE ASSEMBLY

RELATED APPLICATIONS

This patent application is a continuation, and claims priority benefit with regard to all common subject matter, of earlier-filed non-provisional U.S. patent application Ser. No. 15/287,112, filed on Oct. 6, 2016, and entitled SUSPENDED PIPE ASSEMBLY. The above-identified non-provisional patent application is hereby incorporated by reference in its entirety into the present application.

BACKGROUND

The fluid carrying pipes of irrigation systems are often made of galvanized steel or other metals. Some source water has high pH levels and/or contains chemicals, minerals, or other deposits which can cause such metal pipes to corrode and potentially leak. To alleviate this, irrigation systems may be retrofitted with PVC or plastic pipes. However, because it is impractical to replace the existing metal pipes with PVC or plastic pipes, the PVC or plastic pipes are often suspended from the existing metal pipes and the water or other fluid is channeled through the suspended pipes.

Both the metal pipes and the suspended plastic pipes expand and contract longitudinally due to changes in temperature. Unfortunately, the plastic pipes expand and contract at a different rate than the metal pipes. Thus, the suspended pipes often undergo side-to-side buckling, warping, or "snaking" as they expand, which induces stresses on the irrigation systems and the suspended pipes and may create leaks near sprinkler openings along the suspended pipes. Another problem with suspending PVC or plastic pipes from existing metal pipes is that a distance over which the suspended pipes can cover is limited by the maximum available lengths of PVC or plastic pipes.

SUMMARY

Embodiments of the invention solve the above-mentioned problems and provide a distinct advance in suspended pipe assemblies for irrigation systems. More particularly, the invention provides a suspended pipe assembly that can be expanded to any length of irrigation system and does not buckle, warp, or "snake" side to side when expanding or contracting due to temperature changes.

An embodiment of the suspended pipe assembly broadly comprises a first pipe section, a second pipe section, a fixed joint connecting the first and second pipe sections together, a third pipe section, a live joint connecting the second and third pipe sections together, and a number of suspenders for suspending the pipe sections from an irrigation system.

The first pipe section is configured to be suspended from a first span pipe of the irrigation system, the second pipe section is configured to be suspended from a second span pipe adjacent the first span pipe, and the third pipe section is configured to be suspended from a third span pipe adjacent the second span pipe. All three suspended pipe sections may include sprinkler openings for connecting sprinklers along the pipe sections and may be formed of polyethylene (poly), plastic, or any other suitable material that is resistant to corrosion and other deterioration due to chemicals in the fluid, chemicals in the environment, electrochemical reactions, mechanical stress, and wear and tear.

The fixed joint prevents the connected ends of the first suspended pipe section and second suspended pipe section from shifting longitudinally relative to each other. The fixed joint may also prevent the connected ends of the first suspended pipe section and second suspended pipe section from shifting longitudinally relative to the first and second span pipes. The fixed joint may be a heat weld, a bracket, a clamp, or any other suitable fixed joint.

The live joint allows the connected ends of the second suspended pipe section and third suspended pipe section to translate or shift relative to each other so that the second suspended pipe section and third suspended pipe section can expand and contract longitudinally without side-to-side buckling, warping, or "snaking". The live joint may also space the connected ends of the second suspended pipe section and third suspended pipe section from each other even at their maximum displacement (i.e., closest proximity) so that they cannot contact each other. The live joint may be a telescoping joint, clamp and boot-and-coupler joint, expanding bellows joint, flexible joint, flexible conduit, or any other suitable live joint.

The suspenders support the pipe sections below the span pipes and each broadly comprises an upper bracket, a lower bracket, and a link. The upper bracket is connected to one of the span pipes and may be a clamp, clip, clevis, or any other suitable connecting element. The upper bracket may be fixed to one of the span pipes so that its position does not shift relative to upper brackets of the other suspenders.

The lower bracket is connected to one of the suspended pipe sections and may be a clamp, clip, clevis, or any other suitable connecting element. The lower bracket may be fixed to one of the suspended pipe sections so that it only shifts relative to other lower brackets due to the longitudinal expansion and contraction of the suspended pipe sections.

The link connects the upper bracket to the lower bracket via upper and lower fasteners. The upper fastener may allow the link to pivot only about a single axis extending horizontally perpendicular to the elevated pipe and the lower fastener may allow the link to pivot only about a single axis extending horizontally perpendicular to the suspended pipes. That is, the link may be allowed to pivot only in a vertically extending plane extending parallel to the elevated pipe. The fasteners may be pins, bolts, hinges, hooks, clips, or any other suitable connectors. The links may have equal lengths such that the suspended pipes are offset from the elevated pipe an equal amount. Each link may be a rigid flat bar, tube, beam, any other suitable member.

The above-described suspended pipe assembly provides many advantages over conventional systems. For example, the suspended pipe assembly prevents the suspended pipe sections from buckling side-to-side, warping, or "snaking", which reduces the formation of leaks near the sprinkler openings and other connection points. To effect this, the links of the suspenders will pivot along the vertically extending plane via the fasteners such that the suspended pipe sections expand longitudinally and not laterally.

Another advantage over conventional systems is that the suspended pipe assembly can be expanded to include any number of suspended pipe sections with alternating fixed joints and live joints such that each suspended pipe section is fixed to an adjacent suspended pipe section or other fluid-carrying component at one end and connected to an adjacent suspended pipe section or other fluid-carrying component via a live joint at its other end. The fixed joint may be made on-site, which simplifies transportation and assembly of the above components. In some embodiments, the links of the suspenders may all be the same length so that the suspended pipes follow a curvature of the elevated pipe.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF THE DRAWING FIGURES

Embodiments of the present invention are described in detail below with reference to the attached drawing figures, wherein.

Figure 1:
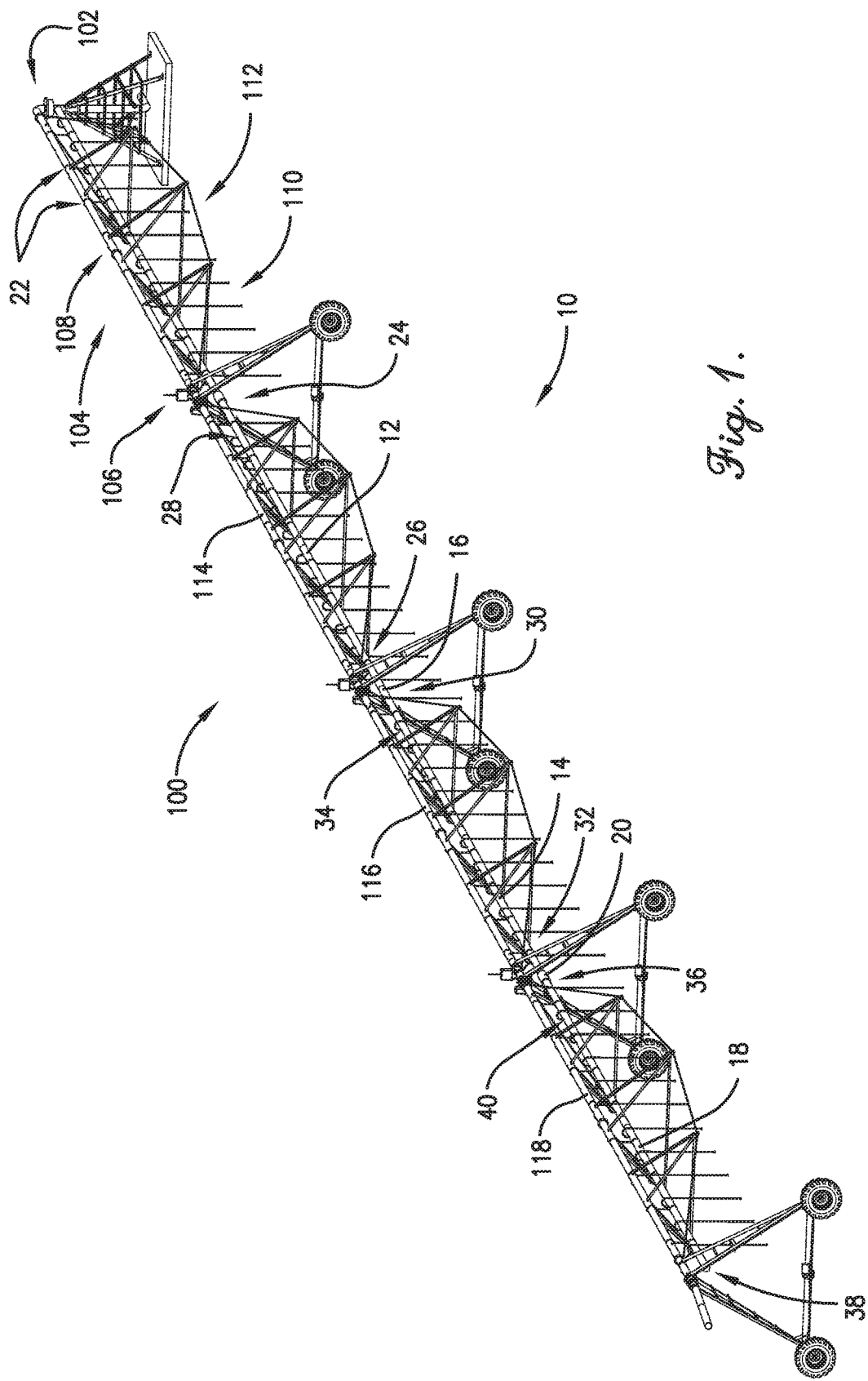
FIG. 1 is a perspective view of a suspended pipe assembly constructed in accordance with an embodiment of the invention and installed on a center-pivot irrigation system.

The drawing figures do not limit the present invention to the specific embodiments disclosed and described herein. The drawings are not necessarily to scale, emphasis instead being placed upon clearly illustrating the principles of the invention.

DETAILED DESCRIPTION OF THE EMBODIMENTS

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the current technology can include a variety of combinations and/or integrations of the embodiments described herein.

Turning to the drawing figures, a suspended pipe assembly 10 constructed in accordance with an embodiment of the invention is illustrated. The suspended pipe assembly 10 is especially configured for use with center-pivot irrigation systems, linear move irrigation systems, stationary irrigation systems, or any fluid distribution system in which water, fertilizers, pesticides, herbicides, oil, gas, sludge, or other fluids (hereinafter "fluids") passing through the fluid distribution system may corrode or otherwise degrade pipes of the fluid distribution system. For example, the suspended pipe assembly 10 may be used for extending the life of an irrigation system 100 (described below).

Embodiments of the irrigation system 100 will first be described in detail with reference to FIG. 1. The illustrated irrigation system 100 is a center-pivot system but the principles of the present invention are also applicable to linear and lateral move irrigation systems, stationary irrigation systems, and any other types of irrigation and fluid delivery systems. The irrigation system 100 broadly comprises a central pivot 102 and a plurality of pivot sections 104. The irrigation system 100 may also include a cantilever extension and/or an end gun.

The central pivot 102 distributes water or other fluids to the pivot sections 104 and may be a tower, a standpipe, or the like. The central pivot 102 may include a support structure for withstanding radial loads, axial loads, and twisting loads, a non-rotatable vertically extending pipe, and a rotatable elbow. The non-rotatable vertically extending pipe carries the fluids to an elevated height. The rotatable elbow connects the pivot sections 104 to the non-rotatable vertically extending pipe such that the pivot sections 104 are free to pivot about the central pivot 102 while remaining connected thereto.

The pivot sections 104 broadly comprise a support tower 106, a horizontally extending span 108, and a plurality of sprinklers 110. The support towers 106 may include an "A-frame" or similar structure for supporting an end of one of the spans 108, a number of wheels connected to the A-frame for traversing across a field, and a motor for powering the wheels. The spans 108 connect adjacent support towers together and each includes a truss structure 112 and a span pipe (first span pipe 114, second span pipe 116, and third span pipe 118 are illustrated). The truss structure 112 provides strength and rigidity to one of the span pipes 114, 116, 118 and may include frame members, cross beams, braces, and other structural members. The span pipes 114, 116, 118 may be configured to carry fluids radially from the central pivot 102 and may be formed of galvanized or un-galvanized steel, aluminum, or any other suitable material. The span pipes 114, 116, 118 may be upward arching for supporting weight of the fluids.

The sprinklers 110 are connected to pipes of the suspended pipe assembly 10 (described below) and spaced from each other for delivering water or other irrigation fluids to a field or other area being irrigated. The sprinklers 110 may have previously been connected directly to the span pipes 114, 116, 118.

The cantilever extension or end gun extends from a radially outward-most pivot section and increases the distribution area of the irrigation system 100. The extension may be retractable or pivotable relative to the outward-most pivot section. The extension may be tapered and/or or upward arching for withstanding cantilever forces.

The suspended pipe assembly 10 will now be described in detail. The suspended pipe assembly 10 broadly comprises a first suspended pipe section 12, a second suspended pipe section 14, a fixed joint 16, a third suspended pipe section 18, a live joint 20, and a number of suspenders 22.

The first suspended pipe section 12 extends substantially parallel to the first span pipe 114 and includes opposed first and second ends 24, 26 and a first plurality of sprinkler openings 28 spaced between the first and second ends 24, 26. The first end 24 may be connected to a fluid source, another elevated pipe, or another suspended pipe section. The second end 26 may be connected to the second suspended pipe section 14. The sprinkler openings 28 allow some of the sprinklers 110 to be connected to the first suspended pipe section 12 at predetermined intervals for delivering fluid along a first swath. The first suspended pipe section 12 may be suspended between approximately six inches and thirty-six inches below the first span pipe 114 so as to follow an arch of the first span pipe 114. In one embodiment, the first suspended pipe section 12 may be suspended fifteen inches below the first span pipe 114. Alternatively, the first suspended pipe section 12 may be suspended horizontally below the first span pipe 114. The first suspended pipe section 12 may be formed of polyethylene (poly), plastic, or any other suitable material and may be resistant to corrosion and other deterioration due to chemicals in the fluid, chemicals in the environment, electrochemical reactions, mechanical stress, and wear and tear.

The second suspended pipe section 14 extends substantially parallel to the second span pipe 116 and includes opposed first and second ends 30, 32 and a second plurality of sprinkler openings 34. The first end 30 may be connected to the second end 26 of the first suspended pipe section 12 via the fixed joint 16 (described below) such that the second end 26 of the first suspended pipe section 12 and the first end 30 of the second suspended pipe section 14 do not shift or translate relative to each other. The sprinkler openings 34 allow some of the sprinklers 110 to be connected to the second suspended pipe section 14 at predetermined intervals for delivering fluid along a second swath. The second suspended pipe section 14 may be suspended between approximately six inches and thirty-six inches below the second span pipe 116 so as to follow an arch of the second span pipe 116. In one embodiment, the second suspended pipe section 14 may be suspended fifteen inches below the second span pipe 116. Alternatively, the second suspended pipe section 14 may be suspended horizontally below the second span pipe 116. The second suspended pipe section 14 may be formed of polyethylene (poly), plastic, or any other suitable material and may be resistant to corrosion and other deterioration due to chemicals in the fluid, chemicals in the environment, electrochemical reactions, mechanical stress, and wear and tear.

The fixed joint 16 connects the second end 26 of the first suspended pipe section 12 and the first end 30 of the second suspended pipe section 14 and prevents the second end 26 of the first suspended pipe section 12 and the first end 30 of the second suspended pipe section 14 from shifting longitudinally relative to each other. The fixed joint 16 may also prevent the second end 26 of the first suspended pipe section 12 and the first end 30 of the second suspended pipe section 14 from shifting longitudinally relative to the first and second span pipes 114, 116. The fixed joint 16 may be a heat weld, a bracket, a clamp, or any other suitable fixed joint.

The third suspended pipe section 18 extends substantially parallel to the third span pipe 118 and includes opposed first and second ends 36, 38 and a third plurality of sprinkler openings 40. The first end 36 may be connected to the second end 32 of the second suspended pipe section 14 via a live joint 20 (described below). The second end 38 of the third suspended pipe section 18 may be connected to another suspended pipe section, an outlet, a fluid dispenser, or any other desired fluid-carrying component via a fixed joint or a live joint. The sprinkler openings 40 allow some of the sprinklers 110 to be connected to the second suspended pipe section 14 at predetermined intervals for delivering fluid along a third swath. The third suspended pipe section 18 may be suspended between approximately six inches and thirty-six inches below the third span pipe 118 so as to follow an arch of the third span pipe 118. In one embodiment, the third suspended pipe section 18 may be suspended fifteen inches below the third span pipe 118. Alternatively, the third suspended pipe section 18 may be suspended horizontally below the third span pipe 118. The third suspended pipe section 18 may be formed of polyethylene (poly), plastic, or any other suitable material and may be resistant to corrosion and other deterioration due to chemicals in the fluid, chemicals in the environment, electrochemical reactions, mechanical stress, and wear and tear.

Figure 2:
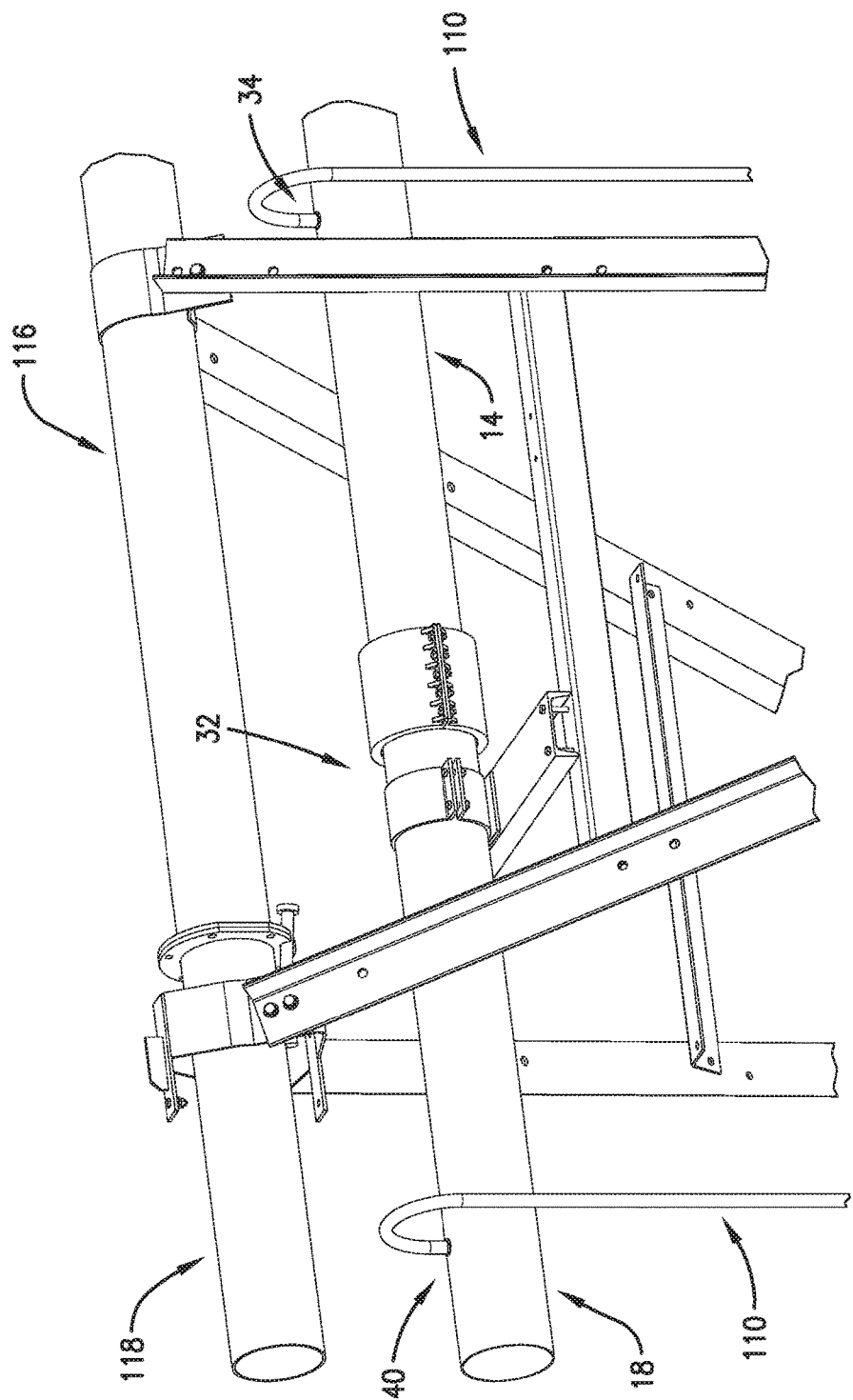
FIG. 2 is an enlarged perspective view of a clamp and boot-and-coupler live joint of the suspended pipe assembly.

The live joint 20 connects the second end 32 of the second suspended pipe section 14 and the first end 36 of the third suspended pipe section 18 and allows the second end 32 of the second suspended pipe section 14 and the first end 36 of the third suspended pipe section 18 to translate relative to each other. This ensures that the second suspended pipe section 14 and the third suspended pipe section 18 can expand and contract longitudinally without side-to-side buckling, warping, or "snaking". The live joint 20 may space the second end 32 of the second suspended pipe section 14 and the first end 36 of the third suspended pipe section 18 from each other even at their maximum displacement so that they cannot contact each other. The live joint 20 may be a clamp and boot-and-coupler joint (FIG. 2), telescoping joint, expanding bellows joint, flexible joint, flexible conduit, or any other suitable live joint.

Figure 3:
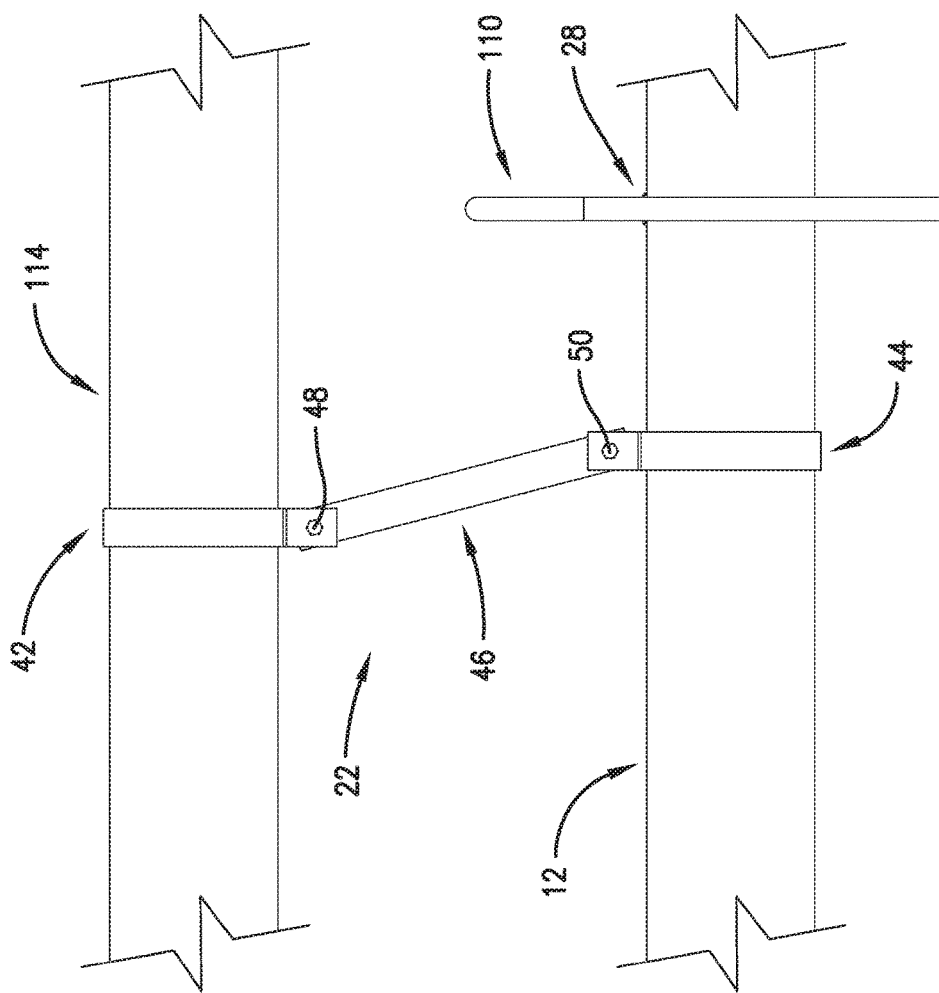
FIG. 3 is an enlarged fragmentary elevation view of a suspender and a pipe section of the suspended pipe assembly.

The suspenders 22 support the suspended pipe sections 12, 14, 18 and each may comprise an upper bracket 42, a lower bracket 44, and a link 46, as shown in FIG. 3. The upper bracket 42 is connected to one of the span pipes 114, 116, 118 and may be a clamp, clip, clevis, or any other suitable connecting element. The upper bracket 42 may be fixed to one of the span pipes 114, 116, 118 so that its position does not shift relative to upper brackets of the other suspenders.

The lower bracket 44 is connected to one of the suspended pipe sections 12, 14, 18 and may be a clamp, clip, clevis, or any other suitable connecting element. The lower bracket 44 may be fixed to one of the suspended pipe sections 12, 14, 18, so that it only shifts relative to other lower brackets due to the longitudinal expansion and contraction of the suspended pipe sections 12, 14, 18.

The link 46 connects the upper bracket 42 to the lower bracket 44 and may be pivotably attached to the upper bracket 42 via an upper fastener 48 positioned near an upper end of the link 46 and pivotably attached to the lower bracket 44 via a lower fastener 50 positioned near a lower end of the link 46. The upper fastener 48 may allow the link 46 to pivot only about a single axis extending horizontally perpendicular to one of the span pipes 114, 116, 118 and the lower fastener 50 may allow the link 46 to pivot only about a single axis extending horizontally perpendicular to one of the suspended pipe sections 12, 14, 18. That is, the link 46 may be allowed to pivot only in a vertically extending plane extending parallel to one of the suspended pipe sections 12, 14, 18. The fasteners 48, 50 may be pins, bolts, hinges, hooks, clips, or any other suitable connectors. The links 46 may have equal lengths such that the suspended pipe sections 12, 14, 18 are offset from the span pipes 114, 116, 118 an equal amount. The link 46 may be a rigid flat bar, tube, beam, or any other suitable member.

Installation of the suspended pipe assembly 10 will now be described in detail. First, the upper brackets 42 of the suspenders 22 may be connected to the span pipes 114, 116, 118 and the lower brackets 44 may be connected to the pipes 12, 14, 18. The pipes 12, 14, 18 may then be lifted into position below the span pipes 114, 116, 118 while the links 46 are connected between the upper brackets 42 and the lower brackets 44 via the fasteners 48, 50 such that the pipes 12, 14, 18 are suspended a desired distance below the span pipes 114, 116, 118.

The fixed joint 16 may then be formed or installed between the first and second suspended pipe sections 12, 14. For example, the first and second suspended pipe sections 12, 14 may be heat welded or clamped together. The live joint 20 may then be connected between the second and third suspended pipe sections 14, 18. Depending on its type and relative position in the suspended pipe assembly 10, the live joint 20 may need to be connected to one of the suspended pipe sections before the adjacent suspended pipe section is installed. The sprinklers 110 may then be connected to the suspended pipe sections 12, 14, 18 via the sprinkler openings 28, 34, 40.

The suspended pipe sections 12, 14, 18 may longitudinally expand and contract due to changes in ambient temperature at different rates than the span pipes 114, 116, 118. The first suspended pipe section 12 and second suspended pipe section 14 will expand longitudinally outwardly from the fixed joint 16, while the second suspended pipe section 14 and the third suspended pipe section 18 will expand longitudinally towards each other via the live joint 20. The links 46 of the suspenders 22 will pivot along the vertically extending plane via the fasteners 48, 50 such that the suspended pipe sections 12, 14, 18 expand longitudinally without side-to-side buckling, warping, or "snaking".

The suspended pipe assembly 10 has been described with only three suspended pipe sections 12, 14, 18 connected by a fixed joint 16 and a live joint 20. However, the suspended pipe assembly 10 can be expanded to include any number of suspended pipe sections with alternating fixed joints and live joints such that each suspended pipe section is fixed to an adjacent suspended pipe section or other fluid-carrying component at one end and connected to an adjacent suspended pipe section or other fluid-carrying component via a live joint at its other end.

The above-described suspended pipe assembly 10 provides many advantages over conventional systems. For example, the suspenders 22 allow the suspended pipe sections 12, 14, 18 to longitudinally expand in the direction of live joints without side-to-side buckling, warping, or "snaking". This prevents the development of leaks near the sprinkler openings 28, 34, 40 and reduces stress on components of the suspended pipe assembly 10 and the irrigation system 100. The links 46 of the suspenders 22 may all be the same length so that the suspended pipe sections 12, 14, 18 follow curvatures of the span pipes 114, 116, 118, which may simplify installation and maintenance.

Alternating between fixed joints and live joints allows the suspended pipe assembly 10 to be expanded to any length of elevated pipe system without adding complexity or unpredictability to the suspended pipe assembly 10. That is, the suspended pipe assembly 10 can be scaled to any desired length by repeating the pattern of suspended pipe sections and alternating fixed joints and live joints. The fixed joint 16 may be made on-site, which simplifies transportation and assembly of the above components.

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. A suspended pipe assembly comprising:
   a first pipe section configured to be suspended from a first section of an elevated pipe, the first suspended pipe section having opposed first and second ends;
   a second pipe section configured to be suspended from a second section of the elevated pipe, the second suspended pipe section having opposed first and second ends, one of the first and second ends of the first suspended pipe section and one of the first and second ends of the second suspended pipe section being adjacent to each other;
   a live joint connecting the adjacent ends of the first and second suspended pipe sections together such that the adjacent ends are free to translate longitudinally relative to each other as at least one of the suspended pipe sections expands and contracts; and
   a plurality of suspenders configured to support at least one of the suspended pipe sections below the elevated pipe.

2. The suspended pipe assembly of claim 1, wherein the suspenders each comprise:
   an upper bracket configured to be connected to the elevated pipe;
   a lower bracket configured to be connected to one of the first suspended pipe section and second suspended pipe section; and
   a link connected between the upper bracket and lower bracket, the link being configured to pivot relative to the upper bracket and lower bracket along a vertically extending plane extending parallel to the elevated pipe such that the lower bracket is configured to translate along the vertically extending plane as the first suspended pipe section or second suspended pipe section expands and contracts.

3. The suspended pipe assembly of claim 2, wherein the link is rigid and configured to only pivot near a first end and a second end of the rigid link.

4. The suspended pipe assembly of claim 2, wherein the links of the suspenders have equal lengths such that the suspended pipes sections are offset from the elevated pipe at equal distances near the suspenders.

5. The suspended pipe assembly of claim 2, wherein the suspenders each further comprise a first fastener connecting the link to the upper bracket and a second fastener connecting the link to the lower bracket, the first fastener and second fastener extending perpendicularly to the vertically extending plane and being configured to prevent the link from pivoting out of the vertically extending plane.

6. The suspended pipe assembly of claim 1, wherein at least one of the first suspended pipe section and second suspended pipe section is configured to be at least partially suspended from an additional section of the elevated pipe.

7. The suspended pipe assembly of claim 1, wherein one of the ends of at least one of the first suspended pipe section and second suspended pipe section is part of a heat-fused joint.

8. The suspended pipe assembly of claim 1, wherein the live joint is a telescoping joint.

9. The suspended pipe assembly of claim 1, wherein the live joint is an expanding bellows joint.

10. The suspended pipe assembly of claim 1, wherein the live joint is a flexible joint.

11. A suspended pipe assembly for use with an irrigation system having a plurality towers and a plurality of spans each extending between adjacent towers, each span including a span pipe, the suspended pipe assembly comprising:
    a first pipe section configured to be suspended from a first span pipe of a first span, the first suspended pipe section having opposed first and second ends;

a second pipe section configured to be suspended from a second span pipe of a second span, the second suspended pipe section having opposed first and second ends, one of the first and second ends of the first suspended pipe section and one of the first and second ends of the second suspended pipe section being adjacent to each other;

a live joint connecting the adjacent ends of the first and second suspended pipe sections together such that the adjacent ends are free to translate longitudinally relative to each other as at least one of the suspended pipe sections expands and contracts; and a plurality of suspenders configured to support at least one of the suspended pipe sections below at least one of the first span pipe and second span pipe.

12. The suspended pipe assembly of claim 11, the suspenders each comprising:

an upper bracket configured to be connected to one of the first span pipe and second span pipe;

a lower bracket configured to be connected to one of the first suspended pipe section and second suspended pipe section; and a link connected between the upper bracket and lower bracket, the link being configured to pivot relative to the upper bracket and lower bracket along a vertically extending plane extending parallel to the span pipes such that the lower bracket is configured to translate along the vertically extending plane as the first suspended pipe section or second suspended pipe section expands and contracts.

13. The suspended pipe assembly of claim 12, wherein the link is rigid and configured to only pivot near a first end and a second end of the rigid link.

14. The suspended pipe assembly of claim 12, wherein the links of the suspenders have equal lengths such that the suspended pipe sections are offset from the span pipes at equal distances near the suspenders.

15. The suspended pipe assembly of claim 12, wherein the link is connected to the upper bracket via a first fastener and connected to the lower bracket via a second fastener, the first fastener and second fastener extending perpendicularly to the vertically extending plane and being configured to prevent the link from pivoting out of the vertically extending plane.

16. The suspended pipe assembly of claim 11, wherein at least one of the first suspended pipe section and second suspended pipe section is configured to be at least partially suspended from an additional span pipe.

17. The suspended pipe assembly of claim 11, wherein one of the ends of at least one of the first suspended pipe section and second suspended pipe section is part of a heat-fused joint.

18. The suspended pipe assembly of claim 11, wherein the live joint is a telescoping joint.

19. The suspended pipe assembly of claim 11, wherein the live joint is an expanding bellows joint.

20. A suspended pipe assembly for use with an irrigation system having a plurality towers and a plurality of spans each extending between adjacent towers, each span including a span pipe, the suspended pipe assembly comprising:

a first poly pipe section configured to be suspended from a first span pipe of a first span, the first poly pipe section having opposing first and second ends;

a second poly pipe section configured to be suspended from a second span pipe of a second span, the second poly pipe section having opposing first and second ends;

a telescoping joint connecting the second end of the first poly pipe section to the first end of the second poly pipe section such that the second end of the first poly pipe section and the first end of the second poly pipe section are free to translate longitudinally relative to each other as at least one of the first poly pipe section and second poly pipe section expands and contracts; and a plurality of suspenders configured to support the first poly pipe section and second poly pipe section below the first span pipe and second span pipe, the suspenders each comprising:

an upper bracket configured to be connected to one of the first span pipe and second span pipe;

a lower bracket configured to be connected to one of the first poly pipe section and second poly pipe section;

a rigid link having a first end and a second end;

a first fastener connecting the rigid link to the upper bracket near the first end of the rigid link; and a second fastener connecting the rigid link to the lower bracket near the second end of the rigid link, the rigid link being configured to pivot relative to the upper bracket and the lower bracket along a vertically extending plane extending parallel to the span pipes such that the lower bracket is configured to translate along the vertically extending plane as the first poly pipe section or second poly pipe section expands and contracts, the first fastener and second fastener being configured to prevent the rigid link from pivoting out of the vertically extending plane, the rigid link of each suspender having equal lengths such that the poly pipe sections are offset from the span pipes at equal distances near the suspenders.

* * * * *